US006935831B2

(12) United States Patent
Joshi

(10) Patent No.: US 6,935,831 B2
(45) Date of Patent: Aug. 30, 2005

(54) METHODS AND APPARATUS FOR OPERATING GAS TURBINE ENGINES

(75) Inventor: Narendra Digamber Joshi, Cincinnati, OH (US)

(73) Assignee: General Electric Company, Schenectady, NY (US)

(*) Notice: Subject to any disclaimer, the term of this patent is extended or adjusted under 35 U.S.C. 154(b) by 69 days.

(21) Appl. No.: 10/699,244

(22) Filed: Oct. 31, 2003

(65) Prior Publication Data

US 2005/0095117 A1 May 5, 2005

(51) Int. Cl.[7] ............................................. F04D 29/58
(52) U.S. Cl. ........................................ 415/1; 415/179
(58) Field of Search ........................... 415/1, 179, 178; 60/775, 39.53, 728

(56) References Cited

U.S. PATENT DOCUMENTS

| | | | |
|---|---|---|---|
| 4,751,814 A | * | 6/1988 | Farrell ..................... 60/39.183 |
| 5,491,971 A | | 2/1996 | Tomlinson et al. |
| 5,758,485 A | * | 6/1998 | Frutschi ....................... 60/772 |
| 5,758,606 A | | 6/1998 | Rosen et al. |
| 5,937,633 A | * | 8/1999 | Wang ........................... 60/792 |
| 6,196,165 B1 | | 3/2001 | Rosen et al. |
| 6,347,605 B1 | | 2/2002 | Wettergard |
| 6,405,686 B1 | | 6/2002 | Wettergard |
| 6,578,362 B1 | | 6/2003 | Coffinberry |
| 6,584,778 B1 | | 7/2003 | Griffiths et al. |

* cited by examiner

*Primary Examiner*—Edward K. Look
*Assistant Examiner*—Dwayne J. White
(74) *Attorney, Agent, or Firm*—Armstrong Teasdale LLP; William Scott Andes

(57) ABSTRACT

A method for operating a gas turbine engine including a first compressor, a second compressor, a combustor and a turbine, coupled together in serial flow arrangement. The method includes channeling compressed airflow discharged from the first compressor to a heat exchanger having an airstream flowing therethrough, channeling an evaporatively cooled airstream into the heat exchanger to facilitate reducing an operating temperature of the heat exchanger, and extracting energy from the compressed airflow using the heat exchanger airstream to facilitate reducing a temperature of the compressed airflow and channeling the compressed airflow from the heat exchanger to the second compressor.

20 Claims, 4 Drawing Sheets

US 6,935,831 B2

METHODS AND APPARATUS FOR OPERATING GAS TURBINE ENGINES

BACKGROUND OF THE INVENTION

This invention relates generally to gas turbine engines, and more specifically to methods and apparatus for operating gas turbine engines.

Gas turbine engines generally include, in serial flow arrangement, a high-pressure compressor for compressing air flowing through the engine, a combustor in which fuel is mixed with the compressed air and ignited to form a high temperature gas stream, and a high pressure turbine. The high-pressure compressor, combustor and high-pressure turbine are sometimes collectively referred to as the core engine. Such gas turbine engines also may include a low-pressure compressor, or booster, for supplying compressed air to the high pressure compressor.

Gas turbine engines are used in many applications, including in aircraft, power generation, and marine applications. The desired engine operating characteristics vary, of course, from application to application. More particularly, when the engine is operated in an environment in which the ambient temperature is reduced in comparison to other environments, the engine may be capable of operating with a higher shaft horse power (SHP) and an increased output, without increasing the core engine temperature to unacceptably high levels. However, if the ambient temperature is increased, the core engine temperature may rise to an unacceptably high level if a high SHP output is being delivered.

To facilitate meeting operating demands, even when the engine ambient temperature is high, e.g., on hot days, at least some known gas turbine engines include inlet system evaporative coolers or refrigeration systems to facilitate reducing the inlet air temperature. At least some known systems use water spray fogging or injection devices to inject water into either the booster or the compressor to facilitate reducing the operating temperature of the engine.

For example, at least one gas turbine includes a booster compressor to facilitate increasing the pressure of the air entering the high pressure compressor, which results in increased power output and efficiency of the gas turbine engine. An intercooler heat exchanger may be positioned between the booster compressor and the high pressure compressor to facilitate reducing the temperature of the air entering the high pressure compressor. Using an intercooler facilitates increasing the efficiency of the engine while reducing the quantity of work performed by the high pressure compressor. At least one known intercooler heat exchanger uses ambient air or water as a cooling medium to cool the air flow exiting the booster compressor. When water is used as the cooling medium, heat from the water is rejected using water cooled cooling towers. Accordingly, the reduction in temperature is limited by the dry bulb ambient air temperature for the air cooled heat exchanger and by the wet bulb temperature for the water cooled heat exchanger. However, air-to-water heat exchangers typically use relatively large quantities of water which may not be available in more arid regions. Furthermore, air-to-air heat exchangers are generally less effective when used on hot days due to a lower air density and an increase in the intercooler exit temperatures, thus resulting in a decrease in the gas turbine power.

BRIEF DESCRIPTION OF THE INVENTION

In one aspect, a method for operating a gas turbine engine, including a first compressor, a second compressor, a combustor and a turbine, coupled in serial flow arrangement, is provided. The method includes channeling compressed airflow discharged from the first compressor to a heat exchanger having an airstream flowing therethrough, channeling an evaporatively cooled airstream into the heat exchanger to facilitate reducing an operating temperature of the heat exchanger, and extracting energy from the compressed airflow using the heat exchanger airstream to facilitate reducing the temperature of the compressed airflow and channeling the compressed airflow from the heat exchanger to the second compressor.

In another aspect, a cooling system for a gas turbine engine, that includes at least a first compressor, a second compressor, and a turbine is provided. The cooling system includes a heat exchanger coupled downstream from the first compressor such that compressed discharge air from the first compressor is routed therethrough, and an evaporative cooler coupled in flow communication with the heat exchanger, the evaporative cooler is configured to channel cooled air into the heat exchanger airstream to facilitate reducing a temperature of the compressed air channeled to the second compressor.

In a further aspect, a gas turbine engine is provided. The gas turbine engine includes a first compressor, a second compressor downstream from the first compressor, a turbine coupled in flow communication with the compressor, a heat exchanger coupled downstream from the first compressor such that compressed discharge air from the first compressor is routed therethrough, the heat exchanger having an airstream flowing therethrough to facilitate transferring heat energy from the compressed discharge air to the airstream, and an evaporative cooler coupled in flow communication to the heat exchanger, the evaporative cooler configured to channel cooled air into the heat exchanger airstream to facilitate reducing a temperature of the compressed air channeled to the second compressor.

DETAILED DESCRIPTION OF THE INVENTION

Figure 1:
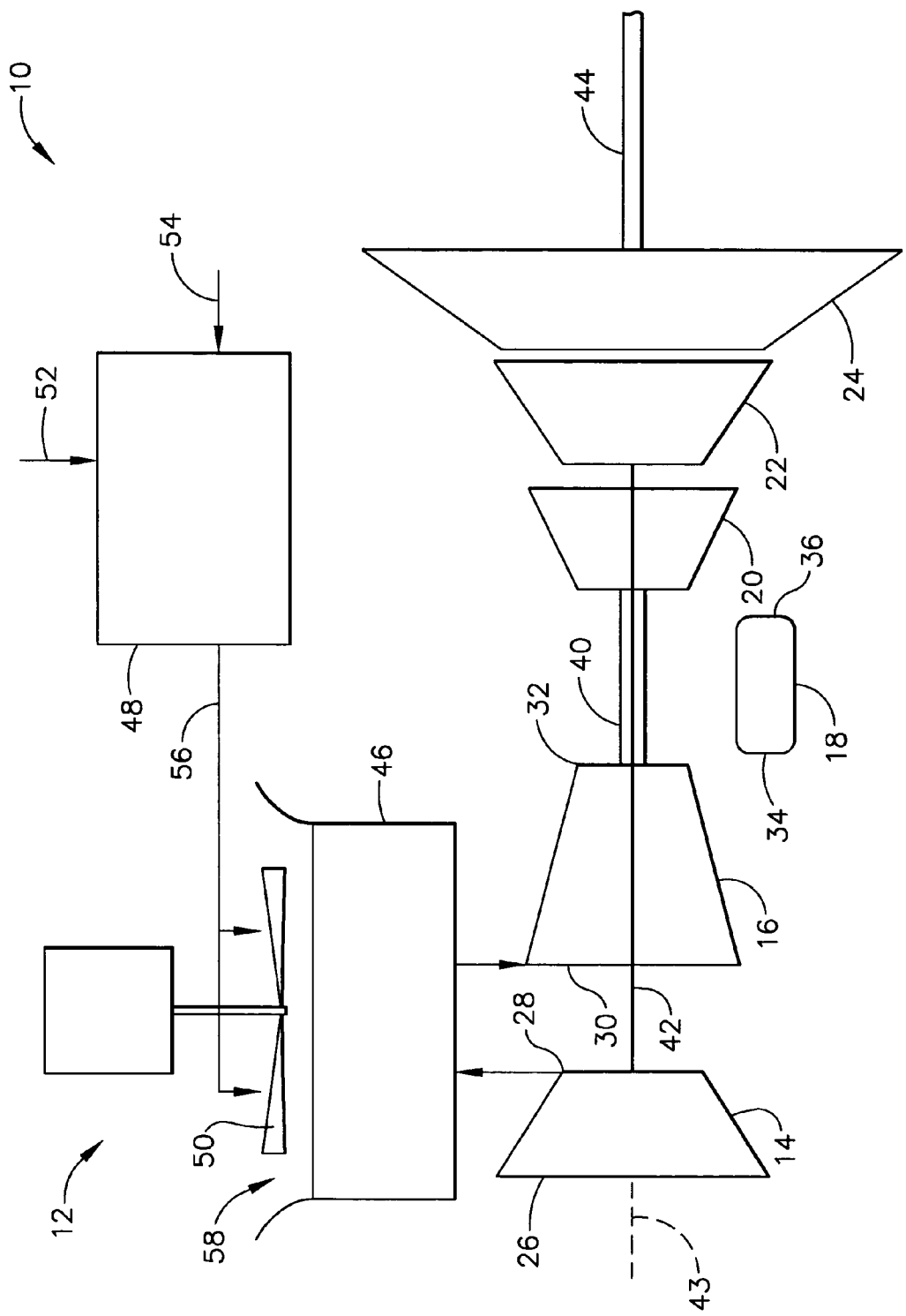
FIG. 1 is a block diagram of an exemplary gas turbine engine including a cooling system.

FIG. 1 is a block diagram of a gas turbine engine 10 including a cooling system 12. With the exception of gas path air cooling system 12, described in more detail below, engine 10 is known in the art and includes, in serial flow relationship, a low pressure compressor or booster 14, a high pressure compressor 16, a combustor 18, a high pressure turbine 20, a low pressure, or intermediate turbine 22, and a power turbine or free turbine 24. Low pressure compressor or booster 14 has an inlet 26 and an outlet 28, and high pressure compressor 16 includes an inlet 30 and an outlet 32.

Combustor 18 has an inlet 34 that is substantially coincident with high pressure compressor outlet 32, and an outlet 36.

High pressure turbine 20 is coupled to high pressure compressor 16 with a first rotor shaft 40, and low pressure turbine 22 is coupled to low pressure compressor 14 with a second rotor shaft 42. Rotor shafts 40 and 42 are each substantially coaxially aligned with respect to a longitudinal centerline axis 43 of engine 10. Engine 10 may be used to drive a load (not shown) which may be coupled to a power turbine shaft 44. Alternatively, the load may be coupled to a forward extension (not shown) of rotor shaft 42.

In operation, ambient air, drawn into low pressure compressor inlet 26, is compressed and channeled downstream to high pressure compressor 16. High pressure compressor 16 further compresses the air and delivers high pressure air to combustor 18 where it is mixed with fuel, and the mixture is ignited to generate high temperature combustion gases. The combustion gases are channeled from combustor 18 to drive turbines 20, 22, and 24.

The power output of engine 10 is at least partially related to the temperatures of the gas flow at various locations along the gas flow path. More specifically, a temperature of the gas flow at high-pressure compressor outlet 32, and a temperature of the gas flow at combustor outlet 36 are closely monitored during the operation of engine 10. Lowering the temperature of the gas flow entering high pressure compressor 16 generally results in increasing the power output of engine 10.

To facilitate lowering the temperature of the gas flow entering high pressure compressor 16, cooling system 12 includes a heat exchanger 46 coupled in flow communication to low pressure compressor 14. Airflow from low pressure compressor 14 is channeled to heat exchanger 46 for additional cooling prior to being returned to high-pressure compressor 16.

Cooling system 12 also includes an evaporative cooler 48 coupled in flow communication to heat exchanger 46, and a fan 50 coupled in flow communication to heat exchanger 46. Evaporative cooler 48 includes a first inlet 52 for receiving ambient air and a second inlet 54 for receiving a working fluid such as, but not limited to, water. The ambient air is combined with the water to cool the ambient air. The cooled air is then discharged from evaporative cooler 48 through an outlet 56, and then channeled into heat exchanger airstream 58 of heat exchanger 46.

Heat exchanger 46 has a working fluid flowing therethrough for storing energy extracted from the gas flow path. In one embodiment, the working fluid is air, and heat exchanger 46 is an air-to-air heat exchanger. Heat exchanger 46 extracts heat energy from the compressed air flow path and channels the cooled compressed air to high pressure compressor 16. More specifically, heat exchanger 46 includes a plurality of tubes (not shown) through which hot compressed air, i.e. airflow from low pressure compressor 14 circulates. The heat is transferred from the circulated air through tube walls (not shown) to an airstream flowing outside of the tube walls that is generated by fan 50.

In operation, ambient air is supplied to evaporative cooler 48 through inlet 52 and water is supplied to evaporative cooler 48 through inlet 54. The water is combined with the ambient air to cool the ambient air. The cooled ambient air is then drawn or channeled into heat exchanger airstream 58 using fan 50, to facilitate reducing the temperature of the cooling medium used in heat exchanger 46.

Figure 2:
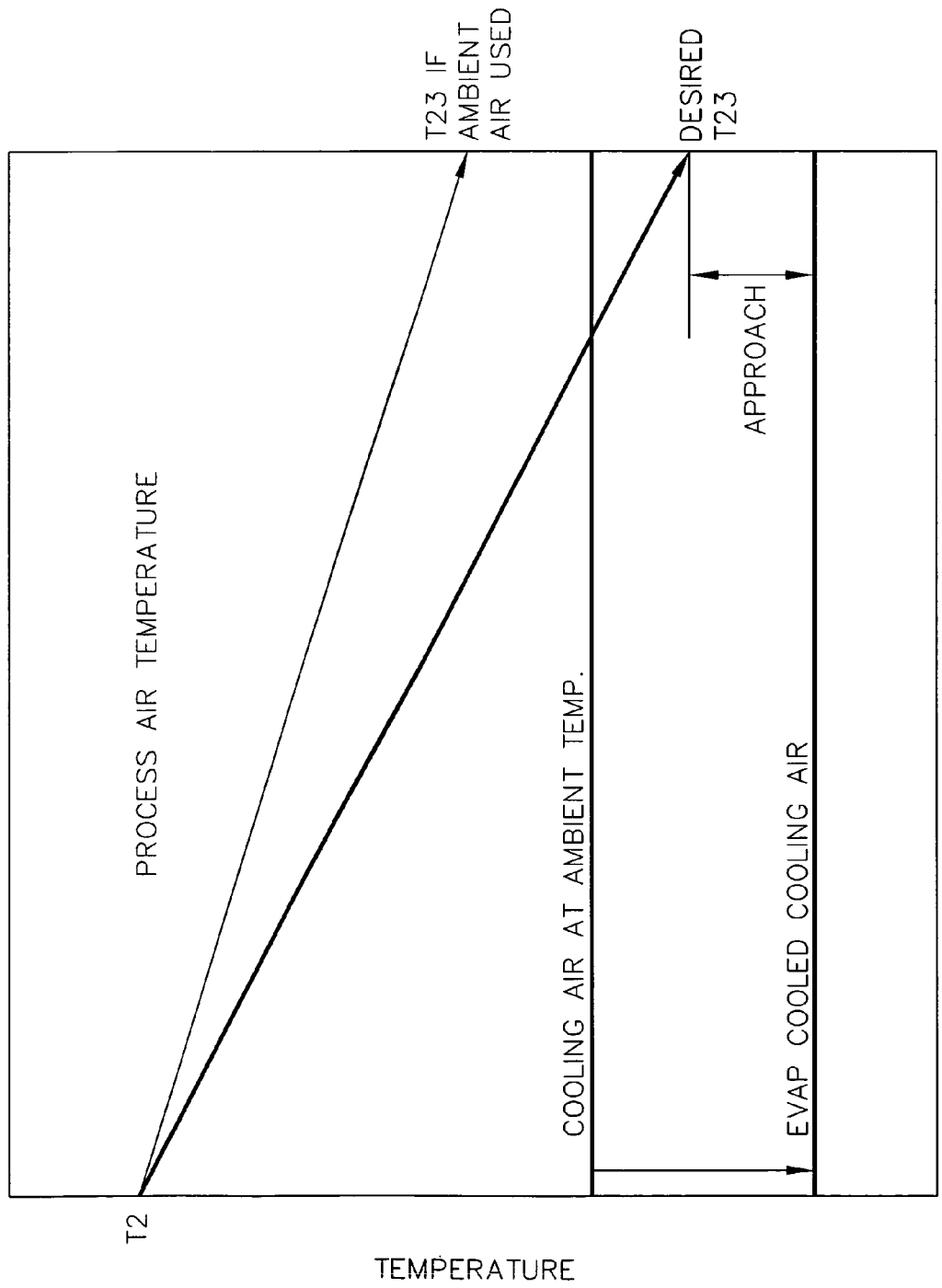
FIG. 2 is an exemplary graphical illustration of the cooling system shown in FIG. 1 during normal gas turbine operation.

FIG. 2 is a graphical illustration of cooling system 12 during normal operation. During operation, on a relatively cool day, no water injection is used since the approach air, i.e. a temperature difference between ambient air temperature (T2) and a desired intercooler air exit temperature (T23) is greater than the minimum required by design to justify the use of heat exchanger 46. In the exemplary embodiment, the minimum design differential is approximately 15° F. As an example, on a 75° F. day, cooling system 12 can extract sufficient heat from the working fluid to reduce the intercooler air exit temperature (T23) to approximately 90° without injecting water into evaporator 48. However, on a relatively warm day, the ambient air temperature during the day can easily exceed 90° F. resulting in an intercooler air exit temperature (T23) of approximately 105° F., which may result in a decrease in output power of engine 10. To facilitate increased power output during such operating conditions, water is supplied to evaporator 48. The water is combined with ambient air to cool the water. The cooled water is discharged through evaporation outlet 56 and sprayed as a fine mist into heat exchanger airstream 58. Fan 50 facilitates dispersing the cooled water into heat exchanger airstream 58 as a fine mist, for example. In the exemplary embodiment, the effective temperature of the air can be lowered to the wet bulb temperature, i.e. approximately ten to twenty degrees Fahrenheit lower than the dry bulb temperature.

In use, cooling system 12 facilitates reducing the temperature of the cooling medium used in heat exchanger 46 to between approximately 70° and 80° thereby reducing the intercooler air exit temperature (T23) to between approximately 90° and 95°. Accordingly, on relatively cooler days, cooling system 12 operates as a "dry system" in which no water is injected into evaporator 48. In contrast, on relatively warm days, water is input to evaporator 48 and combined with ambient air to cool the ambient air. The cooled air is then channeled into heat exchanger airstream 58 as described above. Cooling system 12 thus facilitates in improving power output from turbine engine 10 and an increase in operating efficiency of engine 10. In one embodiment, cooling system 12 facilitates improving power between approximately 5% and 8%.

Figure 3:
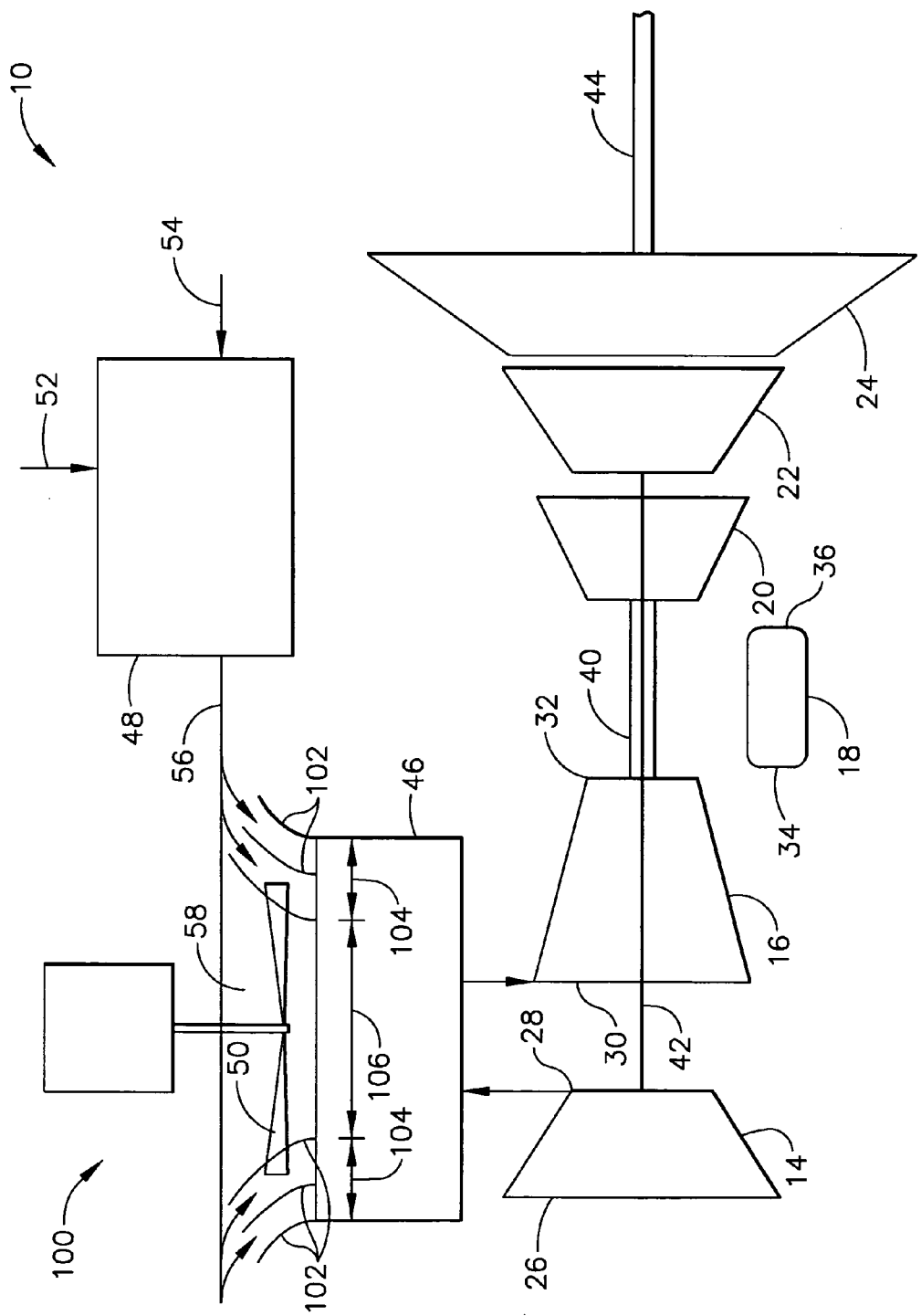
FIG. 3 is a block diagram of an exemplary gas turbine engine including an alternative embodiment of a cooling system.

FIG. 3 is a block diagram of a gas turbine engine 10 which includes a cooling system 100. Cooling system 100 is substantially similar to cooling system 12, (shown in FIG. 1) and components of cooling system 12 that are identical to components of cooling system 100 are identified in FIG. 3 using the same reference numerals used in FIG. 1.

Cooling system 100 includes a heat exchanger 46, including a plurality of baffles 102, is coupled in flow communication to low pressure compressor 14. Air flow from low pressure compressor 14 is channeled to heat exchanger 46 for cooling prior to being returned to high-pressure compressor 16.

Cooling system 100 also includes an evaporative cooler 48 coupled in flow communication to heat exchanger 46, and a fan 50 coupled in flow communication to heat exchanger 46. Evaporative cooler 48 includes a first inlet 52 for receiving ambient air and a second inlet 54 for receiving a working fluid such as, but not limited to, water. Cooled air, discharged from an outlet 56 of evaporator cooler 48, is then channeled into a portion of heat exchanger airstream 58. Heat exchanger 46 has a working fluid flowing therethrough for storing energy extracted from the gas flow path. In one embodiment, the working fluid is air, and heat exchanger 46 is an air-to-air heat exchanger. Heat exchanger 46 includes a plurality of tubes (not shown) through which hot airflow from low pressure compressor 14 circulates. The heat is transferred from the air through tube walls (not shown) to the airstream that is generated by fan 50.

In operation, ambient air is supplied to evaporative cooler 48 through inlet 52 and water is supplied to evaporative cooler 48 through inlet 54. The water is combined with the ambient air to cool the ambient air. The cooled ambient air is then drawn or channeled through baffles 102 into heat exchanger airstream 58 onto a portion 104 of heat exchanger 46, thus reducing the air temperature of the air used as the cooling medium for heat exchanger 46.

Figure 4:
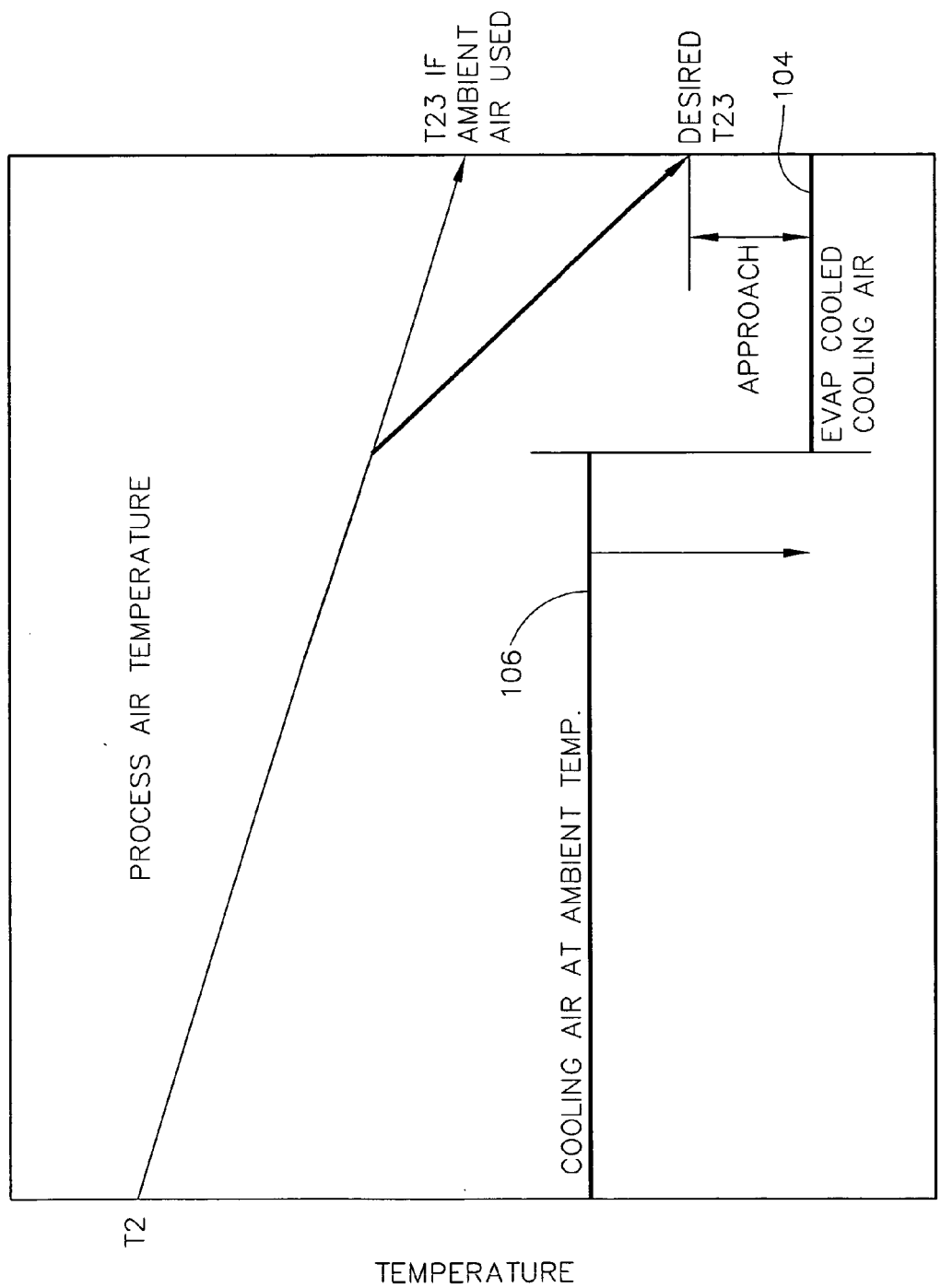
FIG. 4 is a graphical illustration of the cooling system shown in FIG. 3 during normal gas turbine operation.

FIG. 4 is a graphical illustration of cooling system 100 during normal operation. During operation, on a relatively warm day, the ambient air temperature during the day can easily exceed 90° F., resulting in an intercooler air exit temperature (T23) of approximately 105° F., which may result in a decrease in output power of engine 10. To facilitate increased power output during such operating conditions, water is supplied to evaporator 48 and combined with the ambient air to cool the ambient air. The cooled air is discharged through evaporator cooler outlet 56 and sprayed as a fine mist through baffles 102 onto a portion 104 of heat exchanger 46. Accordingly, baffles 102 facilitate separating the evaporator cooled air supplied through baffles 102 onto a portion 104 of heat exchanger 46, and the ambient air supplied onto a portion 106 of heat exchanger 46. Fan 50 facilitates dispersing the ambient air across portion 106, and the second quantity of cooled water across portion 104 of heat exchanger 46 as a fine mist for example.

In use, cooling system 100 facilitates reducing the second quantity of air to its wet bulb temperature. Cooling system 100 thus facilitates improving both power output from turbine engine 10 and an increase in operating efficiency of engine 10 while also reducing the quantity of water used to cool the ambient air. In one embodiment, cooling system 100 facilitates improving power between approximately 5% and 8%.

The above-described cooling system provides a cost-effective and highly reliable method for gas flow cooling in a gas turbine engine. The cooling system uses a minimal quantity of water to cool the ambient air and then uses the cooled air to cool the intercooler to facilitate increasing the potential power output of the engine. Accordingly, a gas path cooling system is provided that facilitates reducing gas path temperatures thereby improving engine efficiency in a cost-effective manner.

Exemplary embodiments of gas path cooling systems are described above in detail. The gas path cooling systems are not limited to the specific embodiments described herein, but rather, components of the system may be utilized independently and separately from other components described herein. Each gas path cooling component can also be used in combination with other gas path cooling components.

While the invention has been described in terms of various specific embodiments, those skilled in the art will recognize that the invention can be practiced with modification within the spirit and scope of the claims.

What is claimed is:

1. A method for operating a gas turbine engine, including a first compressor, a second compressor, a combustor and a turbine, coupled together in serial flow arrangement, said method comprising:
   channeling compressed airflow discharged from the first compressor to a heat exchanger having an airstream flowing therethrough;
   channeling an evaporatively cooled airstream into the heat exchanger to facilitate reducing an operating temperature of the heat exchanger; and
   extracting energy from the compressed airflow using the heat exchanger airstream to facilitate reducing a temperature of the compressed airflow and channeling the compressed airflow from the heat exchanger to the second compressor.

2. A method in accordance with claim 1 further comprising channeling the heat exchanger airstream through the heat exchanger using a fan.

3. A method in accordance with claim 1 wherein channeling an evaporatively cooled airstream into the heat exchanger comprises:
   channeling an ambient airstream into the evaporative cooler;
   cooling the ambient airstream in the evaporative cooler using water; and
   channeling the cooled airstream through a plurality of baffles coupled to the heat exchanger to facilitate reducing an operating temperature within a portion of the heat exchanger.

4. A method in accordance with claim 1 wherein said extracting energy from the compressed airflow using the heat exchanger airstream comprises channeling the evaporatively cooled airstream into a portion of the heat exchanger to facilitate reducing an operating temperature of a portion of the heat exchanger.

5. A method in accordance with claim 4 wherein channeling the evaporative cooler airstream into a portion of the heat exchanger airstream comprises channeling the evaporative cooler airstream into a portion of the heat exchanger such that a temperature gradient between the compressed airflow and the heat exchanger airstream is maintained.

6. A method in accordance with claim 1 further comprising:
   channeling an ambient airflow into a first inlet of the evaporative cooler;
   channeling water into a second inlet of the evaporative cooler; and
   combining the ambient airflow and the water to facilitate reducing a temperature of the ambient airflow prior to channeling the cooled air into the heat exchanger airstream.

7. A method in accordance with claim 1 wherein channeling an evaporatively cooled airstream into the heat exchanger further comprises channeling cooled air from the evaporative cooler into the heat exchanger airstream to facilitate increasing a power output of the engine.

8. A cooling system for a gas turbine engine that includes at least a first compressor, a second compressor, a combustor, and a turbine, said cooling system comprising:
   a heat exchanger coupled downstream from said first compressor such that compressed discharged air from said first compressor is routed therethrough, said heat exchanger having an airstream flowing therethrough; and
   an evaporative cooler coupled in flow communication with said heat exchanger, said evaporative cooler configured to channel an evaporatively cooled airstream into said heat exchanger to facilitate reducing a temperature of the compressed air channeled to the second compressor.

9. A cooling system in accordance with claim 8 further comprising a fan coupled in flow communication with said heat exchanger, said fan directs heat exchanger airstream through said heat exchanger.

10. A cooling system in accordance with claim 8 further comprising:
   an ambient airstream channeled into said evaporative cooler; said ambient airstream cooled by water in said evaporative cooler; and a plurality of baffles coupled to said heat exchanger, said baffles configured to receive said cooled airstream to facilitate reducing an operating temperature within a portion of said heat exchanger.

11. A cooling system in accordance with claim 8 wherein said heat exchanger comprises a plurality of baffles in flow communication with the heat exchanger airstream, said baffles facilitate reducing an operating temperature of a portion of the heat exchanger.

12. A cooling system in accordance with claim 8 further comprising a fan coupled in flow communication with said heat exchanger, said evaporative cooler is configured to channel cooled air into a portion of said heat exchanger airstream, said fan configured to combine the portion of the heat exchanger airstream with ambient air.

13. A cooling system in accordance with claim 8 wherein said evaporative cooler comprises a first inlet configured to receive ambient airflow, and a second inlet configured to receive water, said evaporative cooler configured to extract energy from the water using the ambient airflow to facilitate reducing a temperature of the evaporatively cooled airstream prior to channeling the airstream into the heat exchanger airstream.

14. A cooling system in accordance with claim 8 wherein said evaporative cooler is further configured to channel cooled air into the heat exchanger airstream to facilitate increasing a power output of said engine.

15. A gas turbine engine comprising:
a first compressor;
a second compressor downstream from said first compressor;
a turbine coupled in flow communication with said second compressor;
a heat exchanger coupled downstream from said first compressor such that compressed discharge air from said first compressor is routed therethrough, said heat exchanger having an airstream flowing therethrough to facilitate transferring heat energy from the compressed discharge air to the airstream; and
an evaporative cooler coupled in flow communication to said heat exchanger, said evaporative cooler configured to channel cooled air into said heat exchanger airstream to facilitate reducing a temperature of the compressed air channeled to the second compressor.

16. A gas turbine engine in accordance with claim 15 further comprising a fan coupled in flow communication with said heat exchanger, said fan directs heat exchanger airstream through said heat exchanger.

17. A gas turbine engine in accordance with claim 15 wherein said an evaporative cooler is further configured to channel the evaporatively cooled airstream into a portion of said heat exchanger such that a temperature gradient between the compressed airflow and said heat exchanger airstream is maintained.

18. A gas turbine engine in accordance with claim 15 wherein said heat exchanger comprises a plurality of baffles coupled in flow communication with said evaporative cooler, said baffles facilitate reducing an operating temperature of a portion of the heat exchanger airstream.

19. A gas turbine engine in accordance with claim 15 further comprising a fan coupled in flow communication with said heat exchanger, said evaporative cooler is configured to channel cooled air into a portion of said heat exchanger airstream, said fan configured to combine the portion of said heat exchanger airstream with ambient air.

20. A gas turbine engine in accordance with claim 15 wherein said evaporative cooler comprises a first inlet configured to receive an ambient airflow therethrough, and a second inlet configured to receive water therethrough, said evaporative cooler configured to extract energy from the water using the ambient airflow to facilitate reducing an operating temperature of the evaporative cooler airstream prior to the evaporative cooler airstream being channeled into said heat exchanger airstream.

\* \* \* \* \*